(12) United States Patent
Ishii et al.

(10) Patent No.: US 6,564,674 B2
(45) Date of Patent: May 20, 2003

(54) STEERING WHEEL

(75) Inventors: Tsutomu Ishii, Nishikasugai-gun (JP); Mikine Hayashi, Nishikasugai-gun (JP); Atsushi Nagata, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/883,250

(22) Filed: Jun. 19, 2001

(65) Prior Publication Data

US 2001/0054327 A1 Dec. 27, 2001

(30) Foreign Application Priority Data

Jun. 23, 2000 (JP) ......................... 2000-188733

(51) Int. Cl.[7] ................................................. B62D 1/04
(52) U.S. Cl. ............................................ 74/552; 74/558
(58) Field of Search ................... 74/552, 558, 558.5; 280/750

(56) References Cited

U.S. PATENT DOCUMENTS

| | | | | |
|---|---|---|---|---|
| 6,065,366 | A | * 5/2000 | Koyama et al. | 428/317.1 |
| 6,360,632 | B1 | * 3/2002 | Papandreou | 74/558 |
| 6,386,063 | B1 | * 5/2002 | Hayashi et al. | 74/558 X |
| 6,412,365 | B1 | * 7/2002 | Nagata et al. | 74/558 |
| 6,418,814 | B1 | * 7/2002 | Emeneth et al. | 74/552 |
| 2001/0027698 | A1 | * 10/2001 | Flekenstein | 74/552 |
| 2002/0017157 | A1 | * 2/2002 | Kreuzer et al. | 74/552 |
| 2002/0026850 | A1 | * 3/2002 | Albayrak et al. | 74/552 |
| 2002/0040617 | A1 | * 4/2002 | Albayrak et al. | 74/552 |
| 2002/0073799 | A1 | * 6/2002 | Lorenz | 74/552 |

FOREIGN PATENT DOCUMENTS

| | | | | |
|---|---|---|---|---|
| DE | 4039138 C1 | * 2/1992 | | 74/558 |
| JP | 11091588 | 4/1999 | | |
| JP | 11-255129 | * 9/1999 | | 74/552 |
| JP | 2000-142424 | * 5/2000 | | 74/552 |
| JP | 2002-87282 | * 3/2002 | | 74/552 |

\* cited by examiner

*Primary Examiner*—Vinh T. Luong
(74) *Attorney, Agent, or Firm*—Law Offices of David G. Posz

(57) ABSTRACT

A steering wheel has a ring portion including a core bar and decorative portions which are disposed along the core bar partially to cover an external surface of the core bar. The decorative portions are disposed to cover the external surface of the core bar along the full circumference thereof in a transversely circumferential direction of the ring portion when an upper decorative portion having a substantially inverted U-shaped cross section and a lower decorative portion having a substantially U-shaped cross section which constitute each of the decorative portions are combined together. The steering wheel further has reinforcement ribs formed on the core bar at positions in the vicinity of end portions of one of the decorative portions in such a manner that bend deforming portions of the core bar which allow the ring portion to be inclined partially from the plane of the ring portion when an impact force is applied to the one of the decorative portions on the ring portion are dislocated from a location where the decorative portion is disposed.

2 Claims, 11 Drawing Sheets

STEERING WHEEL

BACKGROUND OF THE INVENTION

1. Field of the Invention

The present invention relates to a steering wheel for allowing the driver to control the direction of vehicle travel, and more particularly to a steering wheel having a construction in which decorative portions are partially provided on a ring portion in a longitudinally circumferential direction thereof.

The present application is based on Japanese Patent Application No. 2000-188733, which is incorporated herein by reference.

2. Description of the Related Art

Conventionally, there is disclosed in Unexamined Japanese Patent Publication No. Hei. 11-91588 a steering wheel which is representative of steering wheels having a construction in which decorative portions are provided on a ring portion of the steering wheel to extend in a longitudinally circumferential direction thereof for providing a feeling of wood. In this steering wheel, a core bar covering portion made of a soft synthetic resin to cover a core bar of a substantially annular ring portion gripped for steering is provided along the circumference of the core bar of the ring portion, and decorative portions are partially disposed on the core bar covering portion to extend in a longitudinally circumferential direction of the ring portion. The decorative portions are made of a hard material and are each formed by combining together an upper decorative portion having a substantially inverted U-shaped cross section and a lower decorative portion having a substantially U-shaped cross section.

In a conventional steering wheel of this type, when an impact force is applied to a central portion on the front side of the decorative portion on the ring portion from above due to collision of an automobile vehicle, the core bar is bent and plastically deformed into substantially a V shape as viewed from a side of the ring portion, with a front side of the ring portion being bent downwards from the plane of the ring portion which extends along an upper surface of the ring portion.

In the conventional steering wheel of this kind, however, since the core bar of the ring portion is bent downwards and deformed into substantially the V shape as viewed from the side of the ring portion, there has been a case where the upper decorative portion is lifted from the lower decorative portion.

Note that backward and forward directions of the steering wheel of the invention when installed on an automotive vehicle correspond to backward and forward directions of the automotive vehicle when the vehicle advances linearly, and that upward and downward directions of the steering wheel correspond to upward and downward directions along axial directions of the steering shaft.

In addition, since the core bar at the decorative portion is bent and deformed in such a manner as to project downwards when the impact force is applied as described above, a tensile force is applied to the lower decorative portion, while a compressive force is applied to the upper decorative portion. Then, since the upper and lower decorative portions are combined together, in addition to the compressive force, a reaction to the tensile force applied to the lower decorative portion is synergistically applied as a compressive force to the upper decorative portion from a longitudinally or transversely circumferential direction of the ring portion. Due to this, distortion generated in the upper decorative portion by the compressive forces grows to thereby produce breaks or cracks thereat.

SUMMARY OF THE INVENTION

The invention was made in view of these situations, and an object thereof is to provide a steering wheel which can suppress lifting of end portions of an upper decorative portion from a lower decorative portion, as well as the production of breaks or cracks in the upper decorative portion which are both generated when an impact force is applied to the decorative portion of a ring portion.

According to a first aspect of the invention, there is provided a steering wheel comprising a substantially annular ring portion gripped for steering which is constituted by a core bar and decorative portions which cover an external surface of the core bar, wherein the decorative portions are disposed partially on the core bar to extend along a longitudinally circumferential direction of the ring portion, while the decorative portions are disposed to cover the external surface of the core bar along the full circumference thereof in a transversely circumferential direction of the ring portion when an upper decorative portion having a substantially inverted U-shaped cross section and a lower decorative portion having a substantially U-shaped cross section which constitute each of said decorative portions are combined together, the steering wheel being characterized in that reinforcement ribs are formed on the core bar at positions in the vicinity of end portions of one of the decorative portions in such a manner that bend deforming portions of the core bar which allow the ring portion to be inclined partially from the plane of the ring portion when an impact force is applied to the one of the decorative portions on the ring portion are dislocated from a location where the decorative portion is disposed.

According to a second aspect of the invention, there is provided a steering wheel comprising a substantially annular ring portion gripped for steering which is constituted by a core bar and decorative portions which cover an external surface of the core bar, wherein the decorative portions are disposed partially on the core bar to extend along a longitudinally circumferential direction of the ring portion, while the decorative portions are disposed to cover the external surface of the core bar along the full circumference thereof in a transversely circumferential direction of the ring portion when an upper decorative portion having a substantially inverted U-shaped cross section and a lower decorative portion having a substantially U-shaped cross section which constitute each of the decorative portions are combined together, the steering wheel being characterized in that a stress concentration portion is formed in an inner circumferential surface of the lower decorative portion at at least a position in the vicinity of a central portion of the lower decorative portion in the longitudinally circumferential direction of the ring portion.

In the steering wheel according to the first aspect of the invention, since the reinforcement ribs are formed on the core bar at the positions in the vicinity of the end portions of one of the decorative portions in such a manner that the bend deforming portions of the core bar which allow the ring portion to be inclined partially from the plane of the ring portion when an impact force is applied to the one of the decorative portions on the ring portion are dislocated from the location where the decorative portion is disposed, even if the impact force is applied to a position in the vicinity of a central portion on the front side of the decorative portion on the ring portion, the decorative portion is bent and deformed not at the locations in the vicinity of the end portions of the decorative portion but at the locations dislocated from the location where the decorative portion is disposed, whereby the lifting of the upper decorative portion from the lower decorative portion is suppressed.

Consequently, with the steering wheel according to the first aspect of the invention, the lifting of the upper decorative portion from the lower decorative portion can be suppressed which would otherwise occur when an impact force is applied to the decorative portion on the ring portion.

In the steering wheel according to the second aspect of the invention, the stress concentration portion is formed in the inner circumferential surface of the lower decorative portion at least the position in the vicinity of the central portion of the lower decorative portion in the longitudinally circumferential direction of the ring portion. Due to this, when an impact force is applied to the position in the vicinity of the central portion on the front side of the ring portion, the core bar is bent and deformed in such a manner as to project downwards, and a tensile force is applied to the lower decorative portion to thereby brake the stress concentration portion. This prevents a reaction to the tensile force on the lower decorative portion from being applied to the upper decorative portion as a compressive force, whereby no force but the compressive force which is originally applied to the upper decorative portion is permitted to be applied to the upper decorative portion, the occurrence of deformation in the upper decorative portion being thus reduced. As a result of this, the generation of breaks or cracks in the upper decorative portion can be suppressed.

Consequently, with the steering wheel according to the second aspect of the invention, the generation of breaks or cracks in the upper decorative portion can be suppressed which would otherwise occur when an impact force is applied to the decorative portion on the ring portion.

Features and advantages of the invention will be evident from the following detailed description of the preferred embodiments described in conjunction with the attached drawings.

DETAILED DESCRIPTION OF THE PREFERRED EMBODIMENTS

An embodiment of the invention will be described below with reference to the accompanying drawings.

Figure 1:
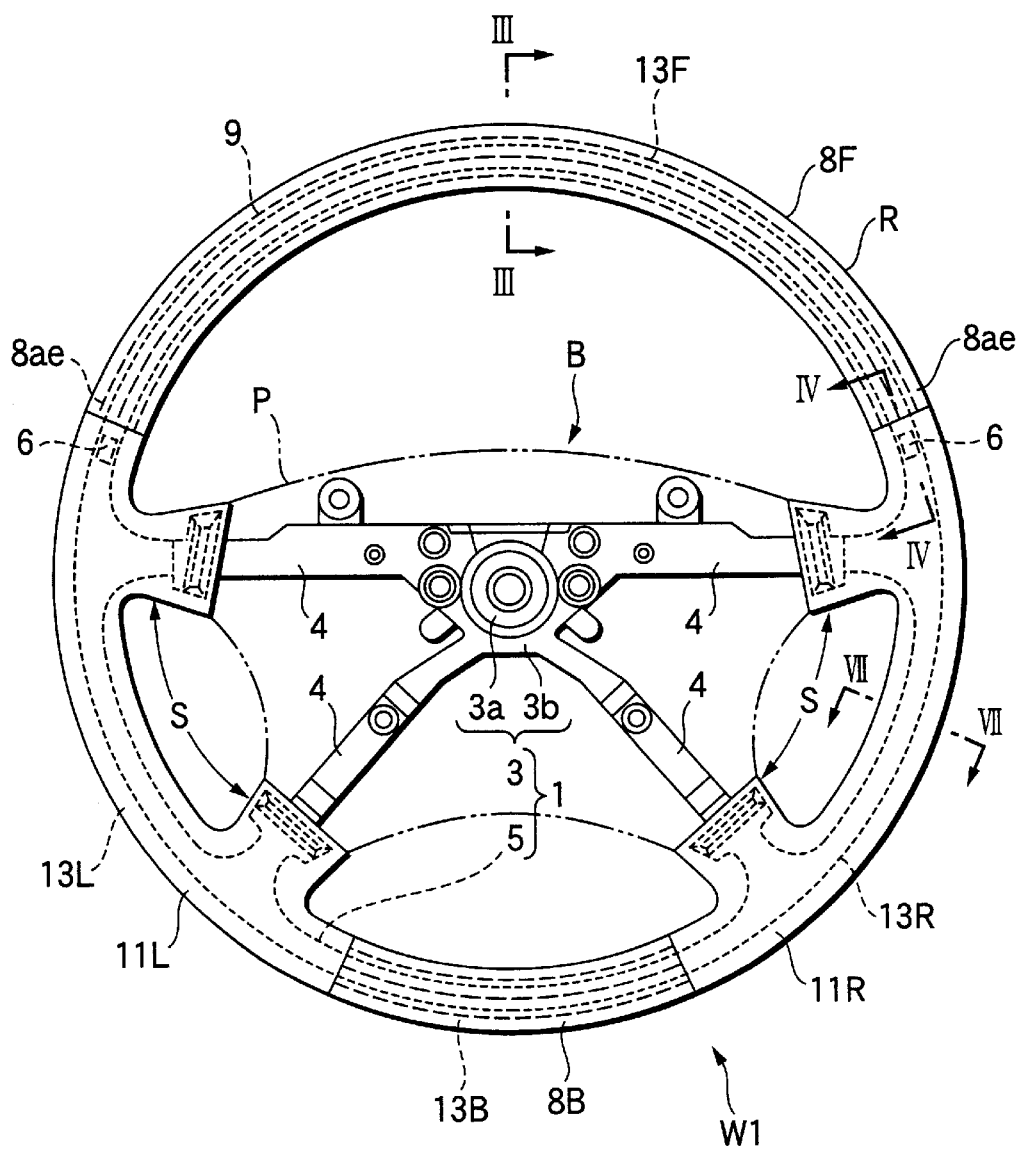
FIG. 1 shows a plan view of a steering wheel according to one embodiment of the invention.

As shown in FIG. 1, a steering wheel W1 according to the embodiment of the invention comprises an annular ring portion R gripped for steering, a boss portion B disposed at the center of the ring portion R and four spoke portions S for connecting the ring portion R to the boss portion B, and steering wheel core bars 1 are disposed at the respective portions so as to connect the respective portions to each other.

Figure 2:
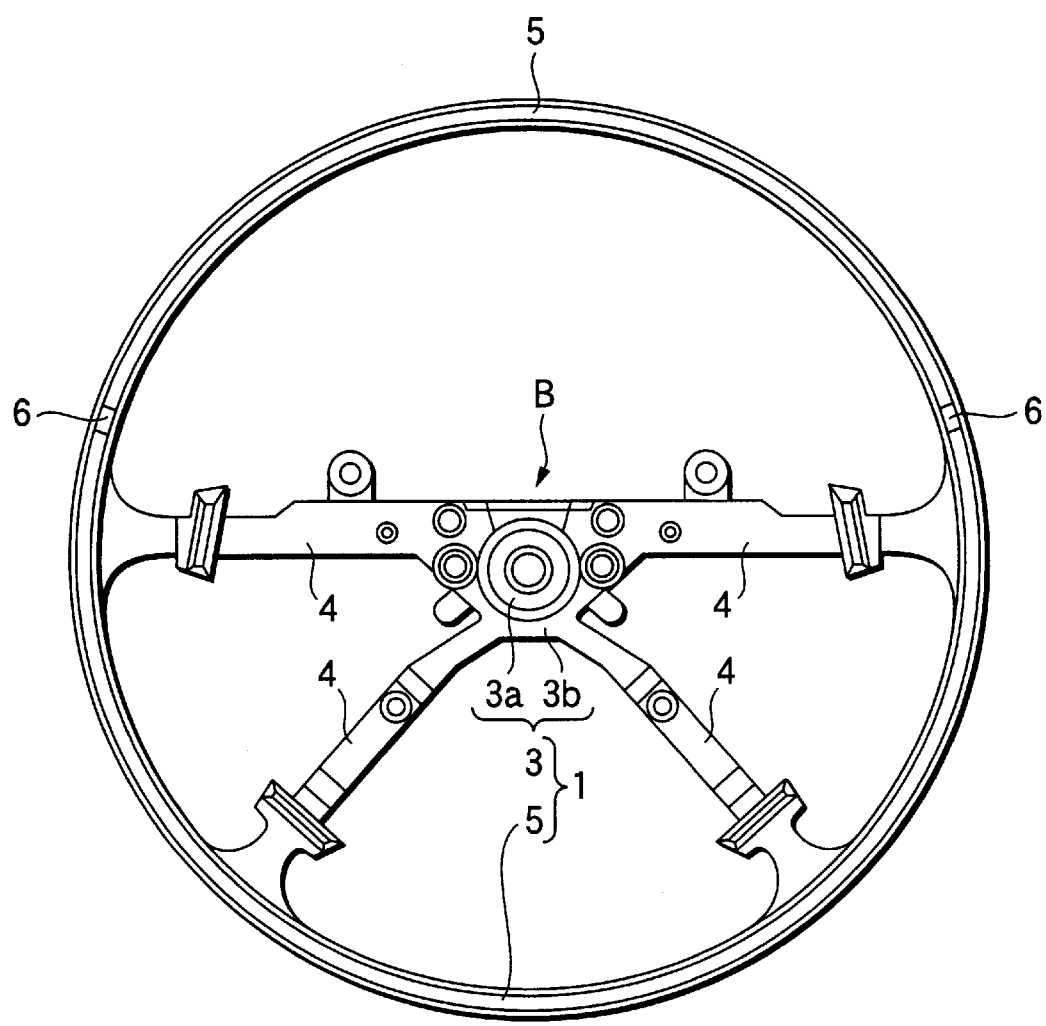
FIG. 2 shows a bottom view showing steering wheel core bars of the steering wheel shown in FIG. 1.

The core bars 1 so disposed include, as shown in FIG. 2, a boss portion core bar 3 disposed at the boss portion B, spoke portion core bars 4 disposed at the respective spoke portions S and a ring portion core bar 5 disposed at the ring portion R. Among the core bars 1, a central boss 3a portion of the boss portion core bar 3 which connects to a steering shaft SS (refer to FIG. 9) of a vehicle is made of steel, while a boss plate 3b around the central boss 3a portion, the spoke portion core bars 4 and the ring portion core bar 5 are made of diecast metal such as diecast aluminum alloy. The ring portion core bar 5 is, as shown in FIG. 3, formed into a shape having a substantially inverted U-shaped cross section.

As shown in FIGS. 1, 2, 4 and 5, reinforcement ribs 6 are formed at positions in the vicinity of end portions 8ae of a decorative portion 8F, which will be described later, of the ring portion core bar 5 to improve the bending rigidity of the ring portion core bar 5 in such a manner as to connect facing walls 5a and 5b of the ring portion core bar 5 which partially constitute the substantially inverted U-shaped cross section thereof to each other. The reinforcement ribs 6 are disposed such that bend deforming portions on the core bar 1 which allow the ring portion to be inclined partially from the plane of the ring portion RF are dislocated from a location where the decorative portion 8F is disposed to be positioned between the spoke portions S and the decorative portion 8F when an impact force is applied to the decorative portion 8F on the ring portion R. Note that the plane of the ring portion RF denotes a plane formed along an upper surface of the ring portion R (refer to FIG. 9).

As shown in FIG. 1, the decorative portions 8 (F, B) are disposed and bonded in the ring portion R at frontward and backward positions thereof as viewed in frontward and backward directions of the vehicle, and leather 11 (L, R) is disposed and bonded in the ring portion R at leftward and rightward positions thereof. Then, soft portions 13 (F, B, L, R) of urethane formed through injection molding (including reaction injection molding) are interposed between the decorative portions 8 (F, B) and the leather 11 (L, R) and the ring portion core bar 5, respectively. The soft portions 13 (L, R) disposed at the leftward and rightward positions of the ring portion R are disposed so as to cover from the circumference of the ring portion core bar 5 as far as the ring portion R side of the respective spoke portion core bars S.

Figure 3:
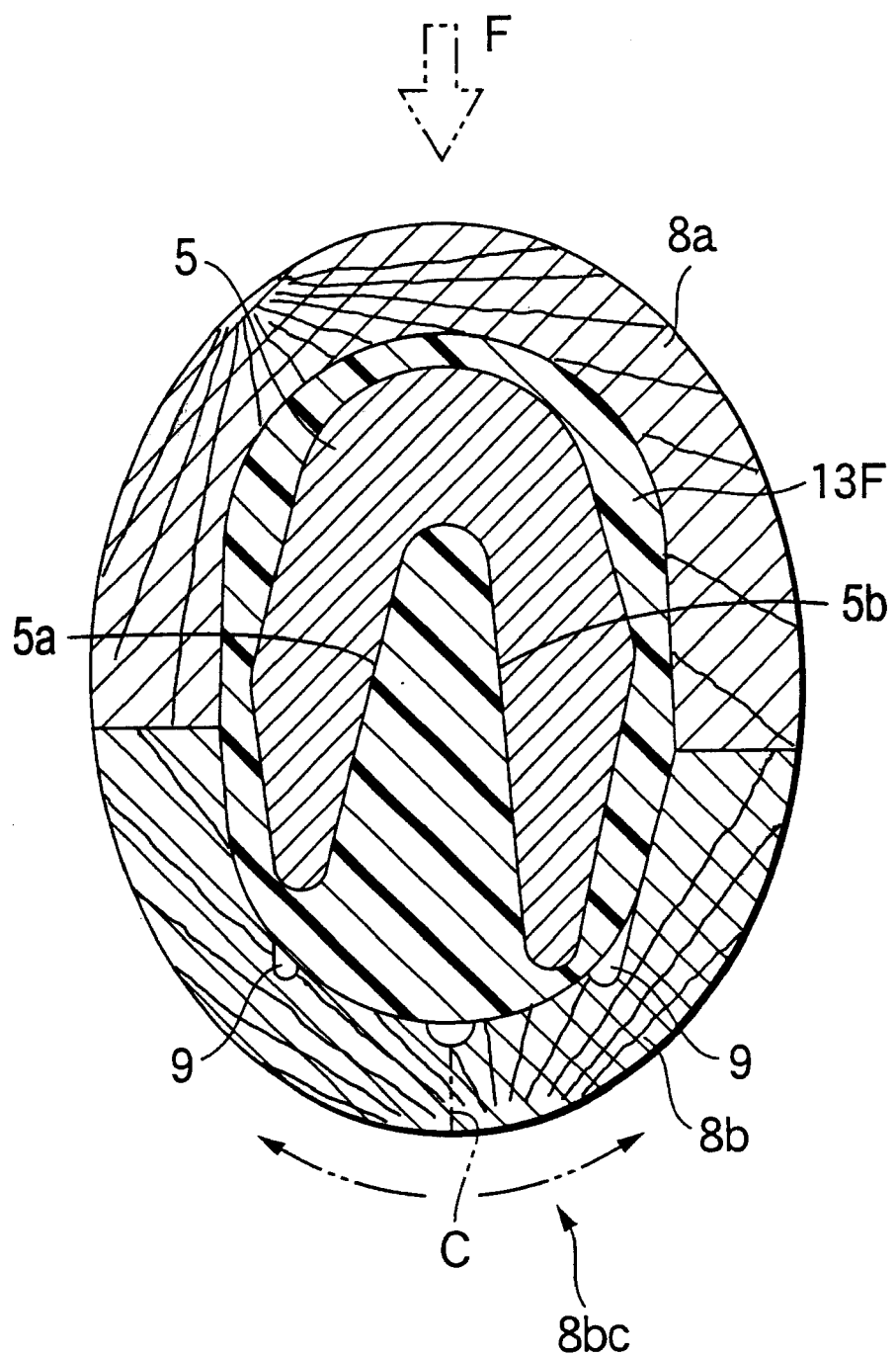
FIG. 3 shows a cross-sectional view, taken along the line III—III of FIG. 1, of a ring portion of the steering wheel according to the same embodiment.

As shown in FIG. 3, the decorative portions 8 (F. B) disposed at the forward and backward positions of the ring portion R are each constructed by combining together an upper decorative portion 8a having a substantially inverted U-shaped cross section and a lower decorative portion 8b having a substantially U-shaped cross section which are vertically divided. The upper decorative portion 8a and the lower decorative portion 8b each comprise a piece of natural wood having a wood grain pattern which is coated with a predetermined protection coating layer.

Figure 6:
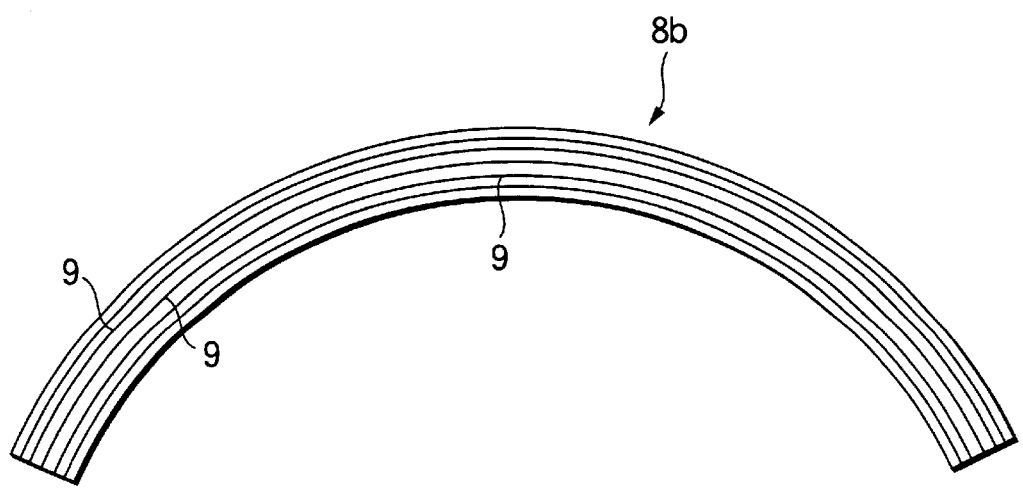
FIG. 6 shows a plan view of a lower decorative portion of the steering wheel shown in FIG. 1.

As shown in FIG. 3, a plurality (three in the illustrated example) of recessed grooves 9 are disposed in an inner circumferential surface of the lower decorative portion 8b so as to be arranged in a transversely circumferential direction of the ring portion R for forming stress concentration portions. As shown in FIG. 6, the respective recessed grooves 9 are formed to extend over substantially the whole area of the lower decorative portion 8b in a longitudinally circumferential direction of the ring portion R.

Figure 4:
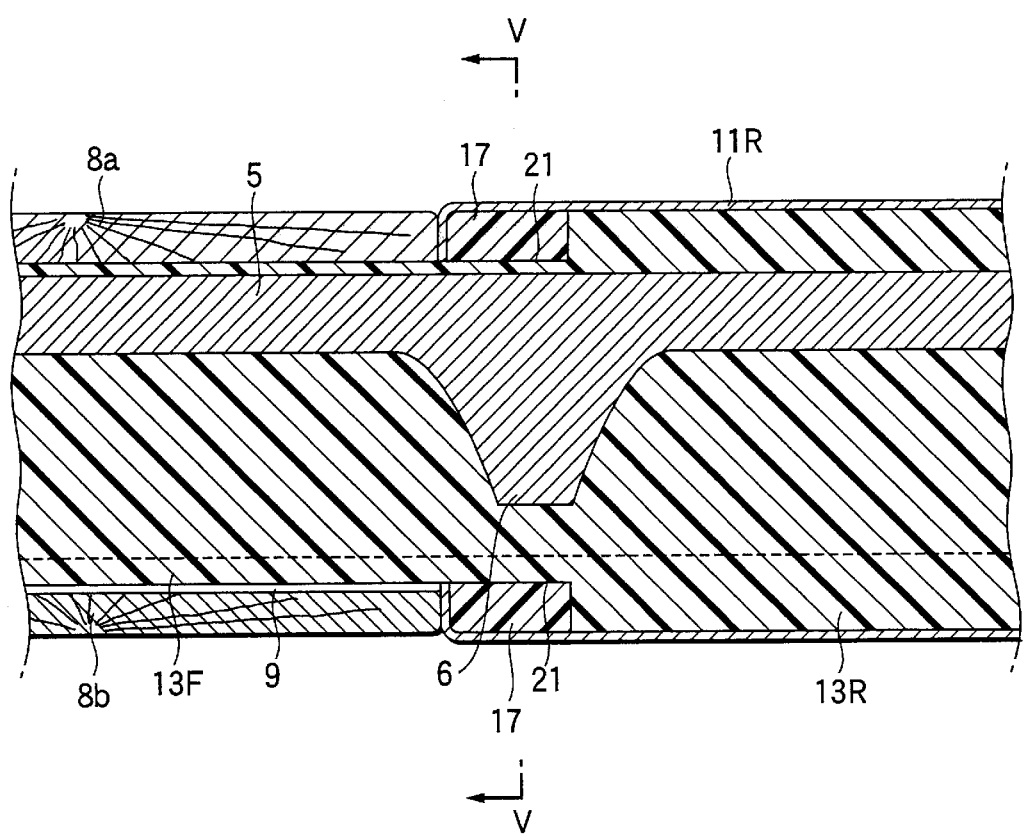
FIG. 4 shows a longitudinal cross-sectional view, taken along the line IV—IV of FIG. 1, of the ring portion of the steering wheel according to the same embodiment.
Figure 5:
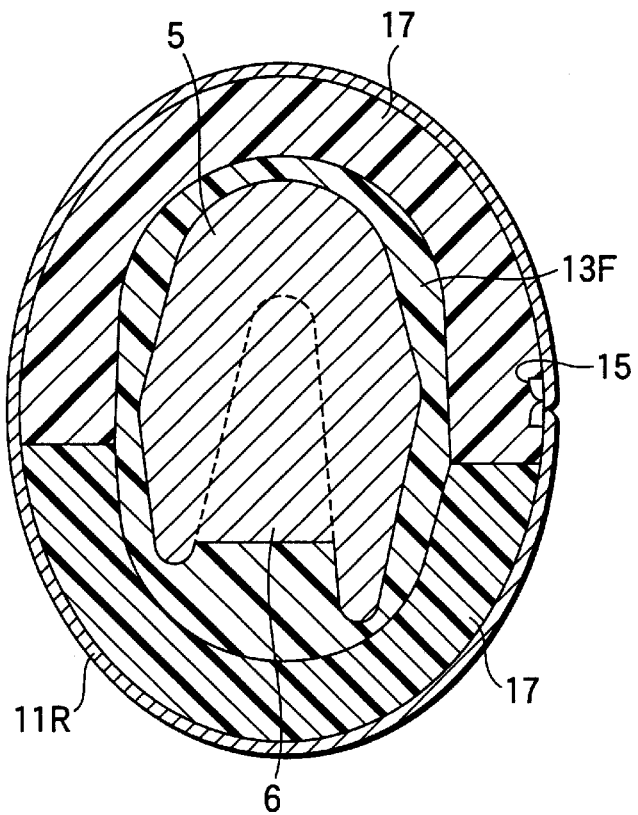
FIG. 5 shows a cross-sectional view, taken along the line V—V of FIG. 4, of the ring portion of the steering wheel according to the same embodiment.
Figure 7:
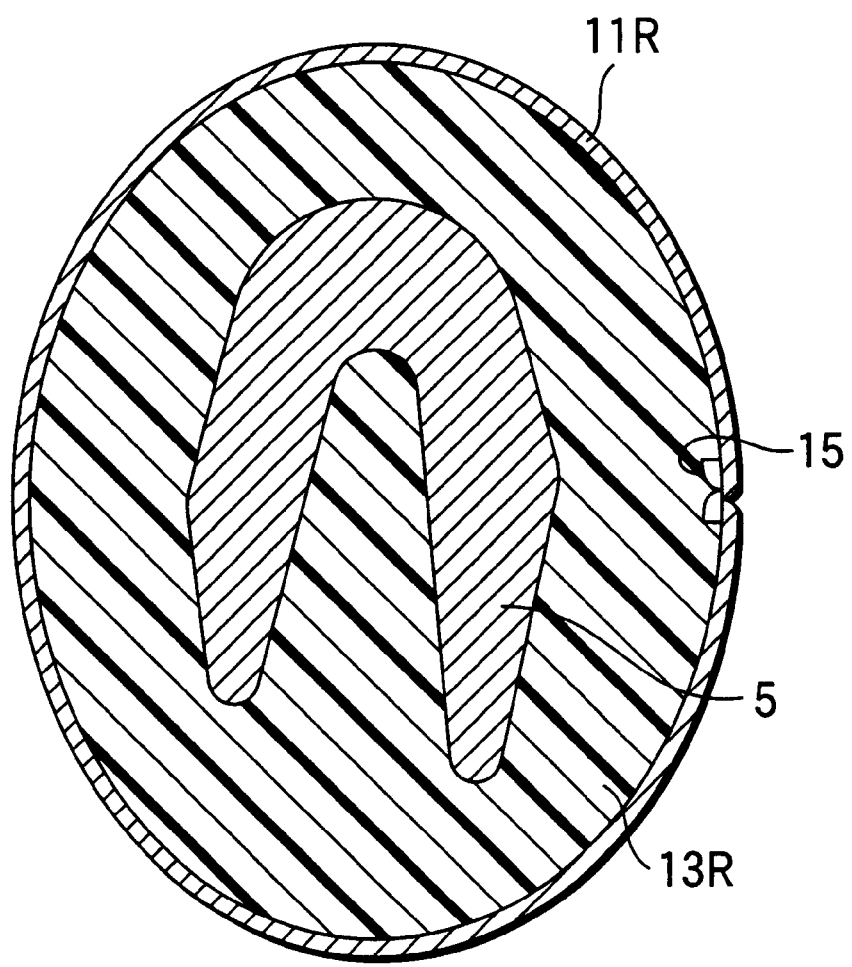
FIG. 7 shows a cross-sectional view, taken along the line VII—VII of FIG. 1, of the ring portion of the steering wheel according to the same embodiment.

As shown in FIG. 7, when disposed at the leftward and rightward positions of the ring portion R the leather 11 (L, R) is wound around the circumference of the ring portion R in the transversely circumferential direction thereof and sewn together at sides thereof with a suture 15. Note that the deployed configuration of each leather 11 (L, R) is such that portions having configurations that can cover upper and lower surfaces of the respective soft portions 13 (L, R), respectively, are connected to each other around the outer circumference of the ring portion R. Then, as shown in FIG. 4, an end of each leather 11 (L, R) is bonded to and wound around an annular core ring 17 formed of a hard synthetic resin such as ABS resin, and the core ring 17 is then bonded to an end of the respective soft portions 13L, 13R. The core ring 17 is divided into a plurality (two in the illustrated example) of pieces in the transversely circumferential direction of the ring portion R, as shown in FIG. 5.

In addition, the soft portions 13F, 13B which are disposed inwardly of the respective decorative portions 8F, 8B to cover the full circumference of the ring portion core bar 5 in the transversely circumferential direction thereof are, as shown in FIG. 4, thinned by the thickness of the decorative portions 8F, 8B than the soft portions 13L, 13R.

Next, a process to produce the steering wheel 1 will be described. Firstly, the steering wheel core bars 1 are produced in advance. The steering wheel core bars 1 are produced through die casting with the boss 3a being set in a predetermined die casting mold.

Figure 8:
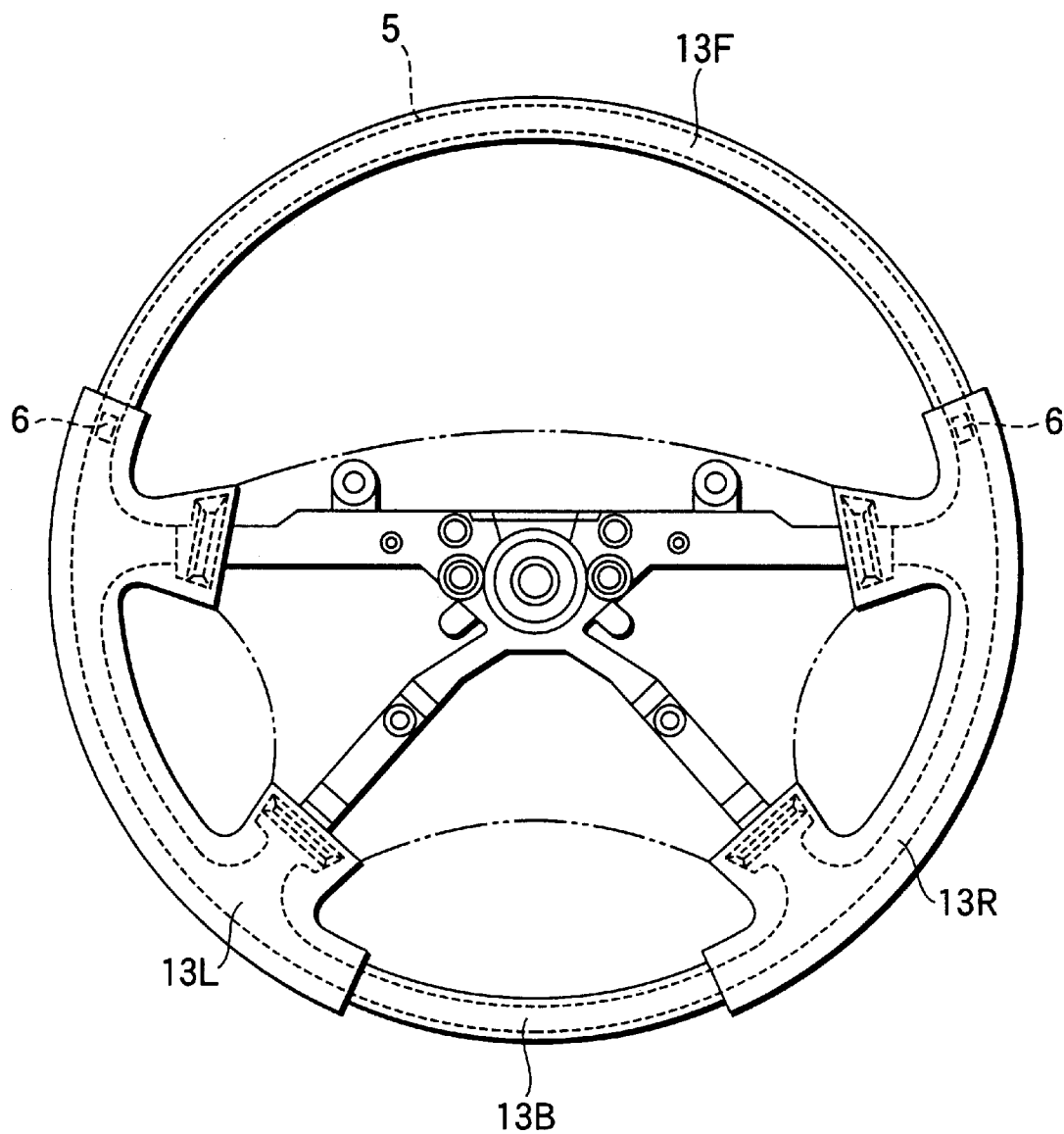
FIG. 8 shows a plan view showing a state in which soft portions are formed on the ring portion core bar of the steering wheel according to the same embodiment.

Then, the steering wheel core bars 1 are set in an injection mold for injection molding the soft portions 13, and a predetermined molding material is injected into a cavity after the mold has been clamped, whereby the soft portions 13 (F, B, L, R) are formed in such a manner as to cover the spoke portion core bars 4 at the ring portion core bar 5 end thereof and the ring portion core bar 5, as shown in FIG. 8.

Following this, the steering core bars 1 on which the soft portions 13 are so formed are then removed from the mold after the mold has been opened, and thereafter, adhesive is applied to outer circumferential surfaces of the respective soft portions 13F, 13B, as well as surfaces corresponding to the upper decorative portion 8a and the lower decorative portion 8b, whereby the upper decorative portion 8a and the lower decorative portion 8b are combined to the outer circumferential surface of the soft portions 13F, 13B, respectively.

Thereafter, end portions 11a of each leather 11L, 11R are bonded to and wound around the core rings 17, and furthermore, after adhesive is applied to the outer circumferential surface of the respective soft portions 13L, 13R, each leather 11L, 11R is wound around the outer circumferential surface of the respective soft portions 13L, 13R on which the adhesive is so applied so as to be bonded thereto while being sewn with a suture 15, whereby the steering wheel W1 can be produced. Note that after being applied with adhesive, the core rings 17 around which the end portions 11a of each leather 11L, 11R are wound are disposed at the end portions of the respective soft portions 13L, 13R to be bonded thereto.

Then, when the steering wheel W1 is mounted on the vehicle, a lower cover, not shown, is assembled to the steering wheel W for covering a lower portion of the boss portion B, and the boss 3a is fastened to the steering shaft SS with nuts, thereafter a pad being mounted for covering an upper portion of the boss portion B, whereby a complete steering wheel W1 can be mounted on the vehicle.

Figure 9:
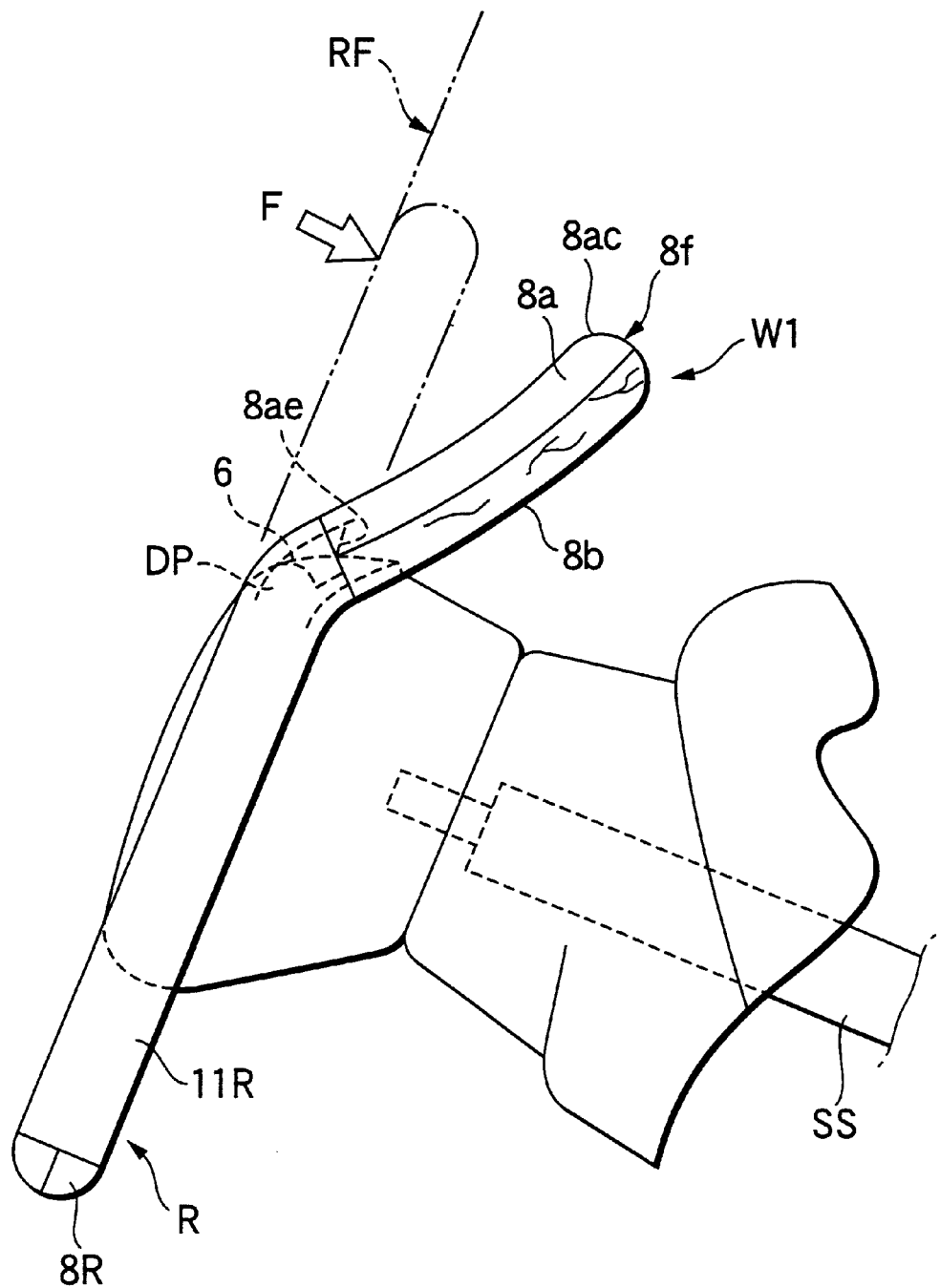
FIG. 9 shows a side view of the steering wheel shown in FIG. 1, showing a state in which the steering wheel is deformed as a result of the application of an impact force thereto.

In the steering wheel W1 according to this embodiment, in the event that an impact force F is applied to a position in the vicinity of a central portion 8ac on the front side of the upper decorative portion 8a on the ring portion from above due to collision of the vehicle, as shown in FIG. 9, the ring portion core bar 5 is plastically deformed at deforming points DP and is bent and deformed into a substantially V shape such that the front side of the plane of the ring portion RF projects downwards as viewed from a side of the steering wheel W1. As this occurs, in the steering wheel W1 according to the embodiment, the reinforcement ribs 6 are formed on the ring portion core bar 5 at the positions in the vicinity of the end portions 8ae of the decorative portion 8F so as to improve the bending rigidity of the ring portion core bar 5 in such a manner as to connect the facing walls which partially constitute the inverted U-shaped cross section to each other. The reinforcement ribs 6 are disposed so that the bend deforming portions on the ring portion core bar 5 which function to allow the plane of the ring portion RF to be inclined partially when an impact force F is applied to the decorative portion 8F on the ring portion R are dislocated from the location where the decorative portion 8F is disposed and that the portion between the spoke portions S and the decorative portion 8F become the deforming points DP. Due to this, the ring portion core bar 5 is bent and deformed not at the positions in the vicinity of the end portions 8ae of the decorative portion 8F but at the positions which are dislocated from the location where the decorative portion 8F is disposed, whereby the upper decorative portion 8a is prevented from being lifted from the lower decorative portion 8b at the end portions 8ae.

In the conventional steering wheel, since the deforming points DP on the ring portion core bar are located at positions in the vicinity of the end portions of the decorative portion which are located within the location where the decorative portion is disposed, once the ring portion core bar is deformed, there have been cases where the upper decorative portion is separated and lifted from the lower decorative portion.

Figure 10:
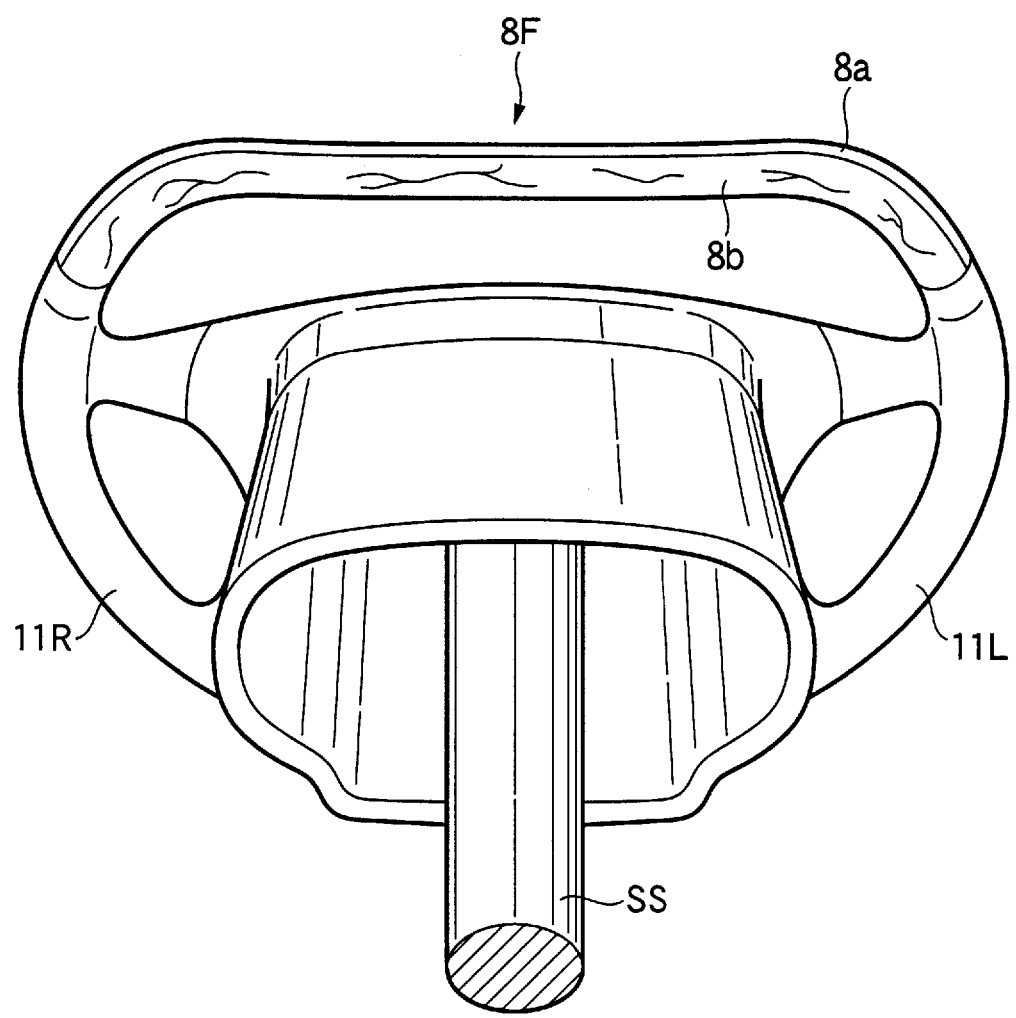
FIG. 10 shows a view showing the deformed state shown in FIG. 9 as viewed from the front side.

In addition, in the steering wheel W1 according to the invention, when an impact force F is applied thereto, as shown in FIG. 10, as viewed from the front, the ring portion core bar 5 is bent and deformed in such a manner as to project downwards. As this occurs, a tensile force is applied to the lower decorative portion 8b of the decorative portion 8F, while a compressive force is applied to the upper decorative portion 8a. In the steering wheel W1 according to the embodiment, however, the construction is adopted in which the recessed grooves 9 are formed in the inner circumferential surface of the lower decorative portion 8b in such a manner as to extend over the full length of the lower decorative portion 8b in the longitudinally circumferential direction of the ring portion R for providing the stress concentration portions. In this construction, when an impact force F is applied to the decorative portion 8F, a tensile force is applied to the lower decorative portion 8b and stress concentration occurs at the locations where the recessed grooves 9 are formed, whereby breaks or cracks indicated by double dashed chain lines in FIG. 3 are generated in circumferential walls of the recessed grooves 9 at positions in the vicinity of the central portion 8bc of the lower decorative portion 8b, the lower decorative portion 8b being separated in the transversely circumferential direction of the ring portion R. This prevents the tensile force acting on the lower decorative portion 8b from acting on the upper decorative portion 8a as a compressive force, this permitting only the compressive force originally applied to the upper decorative force to be so applied to the upper decorative portion 8a. Thus, since the distortion that would be otherwise generated in the upper decorative portion 8a is reduced, the occurrence of breaks or cracks in the upper decorative portion 8a can be suppressed.

Consequently, with the steering wheel W1 according to the embodiment, it is possible to suppress the lifting of the upper decorative portion 8a from the lower decorative portion 8b at the end portions 8ae, as well as the occurrence of breaks or cracks in the upper decorative portion 8a both of which would be otherwise generated when the impact force F is applied to the decorative portion 8F on the ring portion R can be suppressed.

Note that while the steering wheel W1 according to the embodiment is constructed so as to be provided with both the reinforcement ribs 6 that are disposed at the positions in the vicinity of the end portions 8ae of the decorative portion on the ring portion core bar 5 and the recessed grooves (stress concentration portions) 9 which are formed in the inner circumferential surface of the lower decorative portion 8b, the steering wheel may be provided with only one of the two features.

In addition, while there are formed three recessed grooves 9 in the embodiment, the number of recessed grooves 9 to be formed is not limited to that particular number but a single or a plurality of recessed grooves may be formed. Additionally, while the recessed grooves 9 are formed in the lower decorative portions 8b of the respective decorative portions 8F, 8B, respectively, in the embodiment, since an impact force F is normally applied to the position in the vicinity of the central portion on the front side of the decorative portion 8F on the ring portion R from above when the steering wheel W1 is mounted on the vehicle, the recessed grooves 9 may be formed only in the lower decorative portion 8b of the decorative portion 8F.

Figure 11:
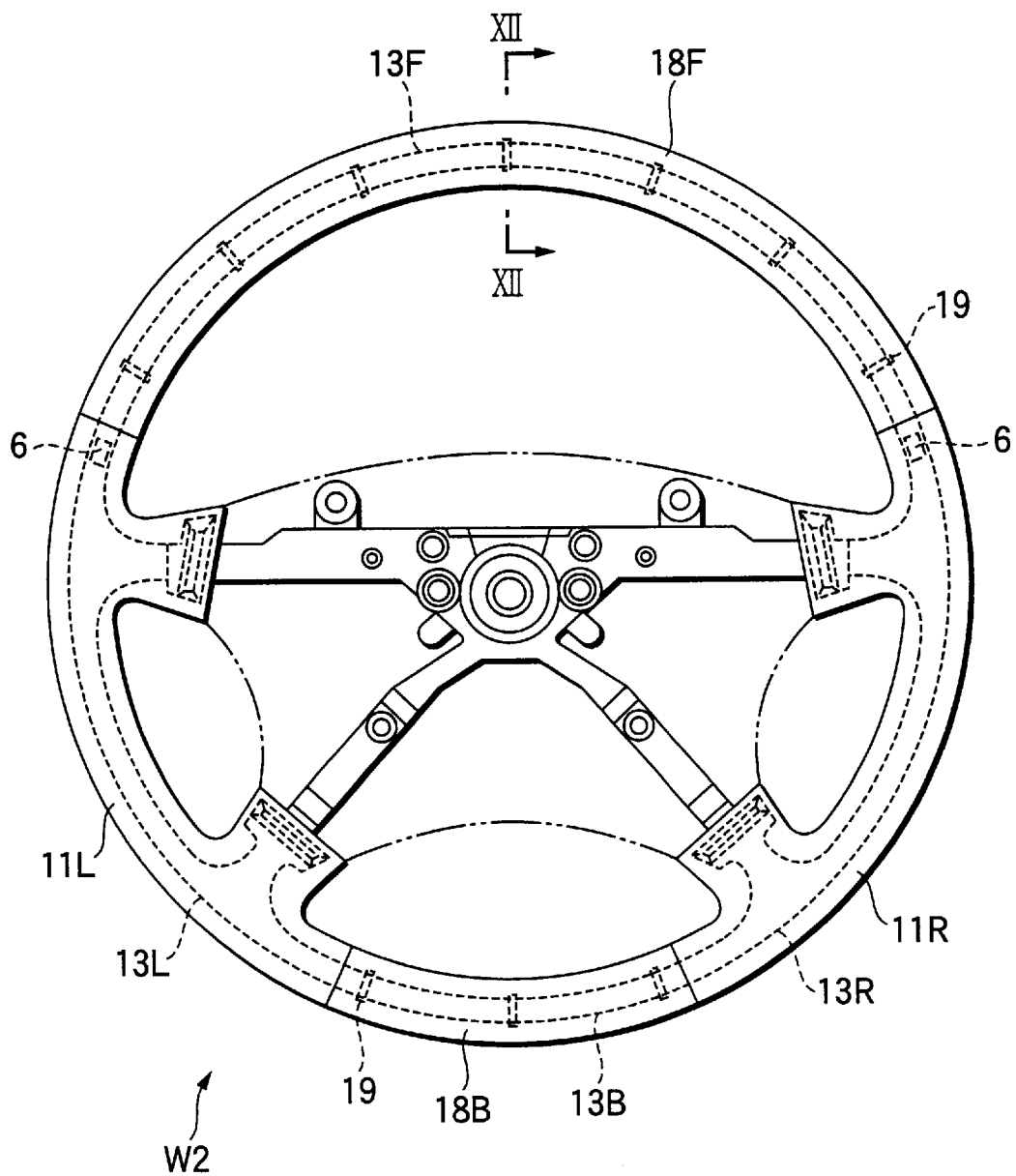
FIG. 11 shows a plan view of a steering wheel according to the other embodiment.
Figure 12:
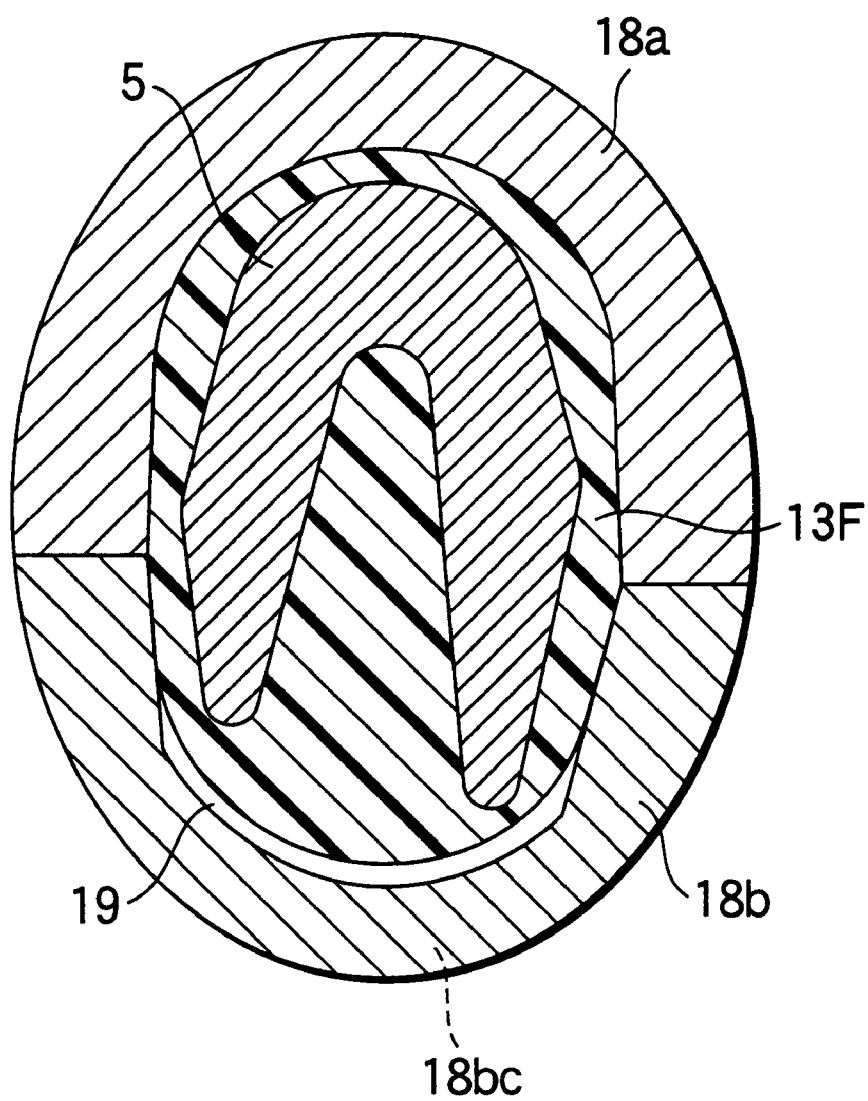
FIG. 12 shows a cross-sectional view taken along the line XII—XII of FIG. 11.

Furthermore, as shown in FIGS. 11, 12, there may be provided a steering wheel W2 in which recessed grooves 19 are formed in lower decorative portions 18b of decorative portions 18F, 18B, respectively, in such a manner as to extend along a transversely circumferential direction of a ring portion R. In a case where such a construction is adopted, cracks or breaks are generated in locations where the recessed grooves 19 are disposed, whereby the lower decorative portions 18b fail in a longitudinally circumferential direction of the ring portion R. While the plurality of recessed grooves 19 are disposed in the lower decorative portions 18b in such a manner as to be arranged radially relative to the center of the ring portion R in the illustrated example, there may be adopted a construction in which a single recessed groove 19 is formed in each of the lower decorative portions 18b at a position in the vicinity of a central portion 18bc of the lower decorative portion 18b in the longitudinally circumferential direction of the ring portion R. This is because when an impact force is applied to, for example, the decorative portion 18F, a maximum tensile force tends to be generated at the central portion 18bc in the longitudinally circumferential direction of the lower decorative portion 18b, and therefore, with a recessed groove 19 being formed in a position in the vicinity of the longitudinally circumferentially central portion of the lower decorative portion, when the impact force is so applied, cracks C are generated in circumferential walls of the recessed groove 19, and the lower decorative portion 18b fails in the longitudinally circumferential direction of the ring portion R, whereby occurrence of breaks or cracks in the upper decorative portion 18a can be prevented to a sufficient extent.

Note that while the recessed grooves 9, 19 are disposed so as to form the stress concentration portions in the embodiments, there may be adopted a construction in which partially small hole-like recessed portions may be disposed, instead of the recessed grooves, to form the stress concentration portions.

Additionally, while the decorative portion comprising the piece of natural wood having a wood grain pattern which is coated with the protection coating layer is illustrated as the decorative portion 8, the decorative portion 8 may be constituted by a combination of two layers of a base portion made of hard synthetic resin and a wood portion made of a piece of natural wood having a wood grain pattern which is laminated over an outer circumferential surface of the base portion, respectively, or by a single layer of a uniform material portion made of hard synthetic resin or the like.

Furthermore, while the soft portions 13 (F, B, L, R) are illustrated as being injection molded in the embodiment, if the soft portions 13 (F, B, L, R) can be formed so as to cover the ring portion core bar 5 by using a molding tool, the production process of the soft portions (F, B, L, R) is not limited to the injection molding, but they may be formed via compression molding or casting. In addition, since the soft layers 13 (F, B) are interposed between the decorative portions 8 (F, B), 18 (F, B) and the ring portion core bar 5, with an impact force of less magnitude being applied to the decorative portion, there will be no risk of breaks or cracks being generated in the decorative portion.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A steering wheel, comprising:
    an annular ring portion having a core bar and a decorative portion covering an external surface of said core bar, wherein
    said decorative portion is disposed partially on said core bar to extend along a longitudinally circumferential direction of said ring portion, while said decorative portion is disposed to cover the external surface of said core bar along a full circumference thereof in a transversely circumferential direction of said ring portion, said decorative portion comprising an upper decorative portion having a inverted U-shaped cross section and a lower decorative portion having a U-shaped cross section combined together; and a reinforcement rib being formed on said core bar at a position in a vicinity of an end portion of said decorative portion, the position not being covered with the decorative portion, in such a manner that a bend deforming portion of said core bar which allows said ring portion to be inclined partially from a plane of said ring portion when an impact force is applied to said decorative portion on said ring portion is dislocated from a location where said decorative portion is disposed.

2. A steering wheel according to claim 1, wherein said core bar has an inverted U-shaped cross section, and said reinforcing rib is disposed to connect facing walls of said core bar which partially constitute the U-shaped cross section.

* * * * *